United States Patent [19]

Boyko et al.

[11] 4,035,900
[45] July 19, 1977

[54] INSERT INSTALLING MACHINE

[76] Inventors: Daniel Boyko, 9/16 Barzilai St., Rishon Le Zion; David Wallach, 10 Ness Ziona St., Holon; Mordecai Gasul, 186/24 Jerusalem Blvd., Kiriath Sharett, Holon, all of Israel

[21] Appl. No.: 672,548

[22] Filed: Mar. 31, 1976

[30] Foreign Application Priority Data

May 9, 1975   Israel .................................... 47265
Mar. 9, 1976   Israel .................................... 49178

[51] Int. Cl.² .......................................... B23Q 7/10
[52] U.S. Cl. .................................... 29/795; 29/809; 29/469.5
[58] Field of Search ............. 29/211 R, 211 C, 200 R, 29/208 R, 240, 469.5

[56] References Cited
U.S. PATENT DOCUMENTS

| | | | |
|---|---|---|---|
| 2,943,335 | 7/1960 | Daniel et al. ................... | 29/211 R |
| 3,104,458 | 9/1963 | Conviser .......................... | 29/208 R |
| 3,192,615 | 7/1965 | Halverson ....................... | 29/211 R |
| 3,279,045 | 10/1966 | Dixon .............................. | 29/208 R |
| 3,634,920 | 1/1972 | Maguire ......................... | 29/211 R X |

OTHER PUBLICATIONS

"Keeping Bolts Tight with Anaerobics," Machine Design, Mar. 25, 1976.

*Primary Examiner*—Victor A. DiPalma
*Attorney, Agent, or Firm*—Browdy and Neimark

[57] ABSTRACT

This invention pertains to machines for installing tapped nuts, studs, or the like machine parts, whether or not having their outer surface provided with thread, knurling or similar profiles, which are to be pressed into corresponding cavities provided in a work piece, usually made of a material softer than the material of the said machine parts. The machine comprises a framework for supporting a vertically reciprocable, horizontally tractable installer head with a rotatable spindle onto which inserts are threaded one at a time for the installation thereof in suitable bores provided in the work and control means for reversing the rotation of the spindle on every installing cycle, said machine comprising insert holding means transferable between a first position, wherein the insert is held in axial alignment with respect to said spindle and a second position; means for transferring the said holding means from the first position to the second position after the threading of an insert on said spindle and means for feeding inserts to said holding means when in the second position.

24 Claims, 9 Drawing Figures

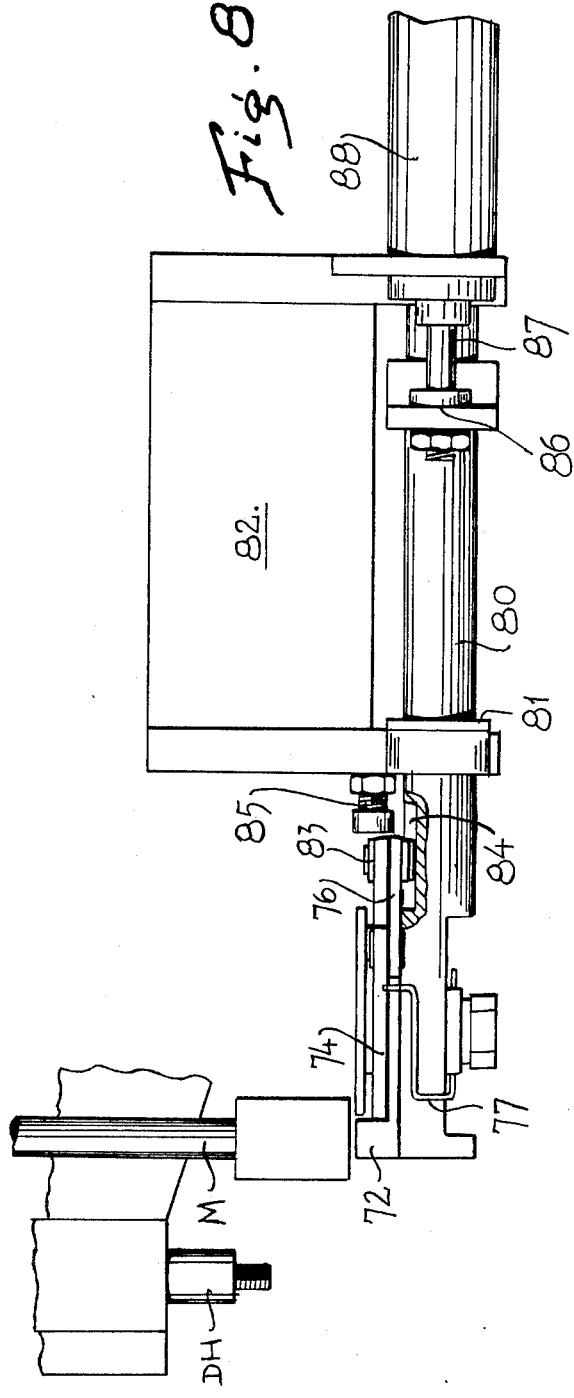
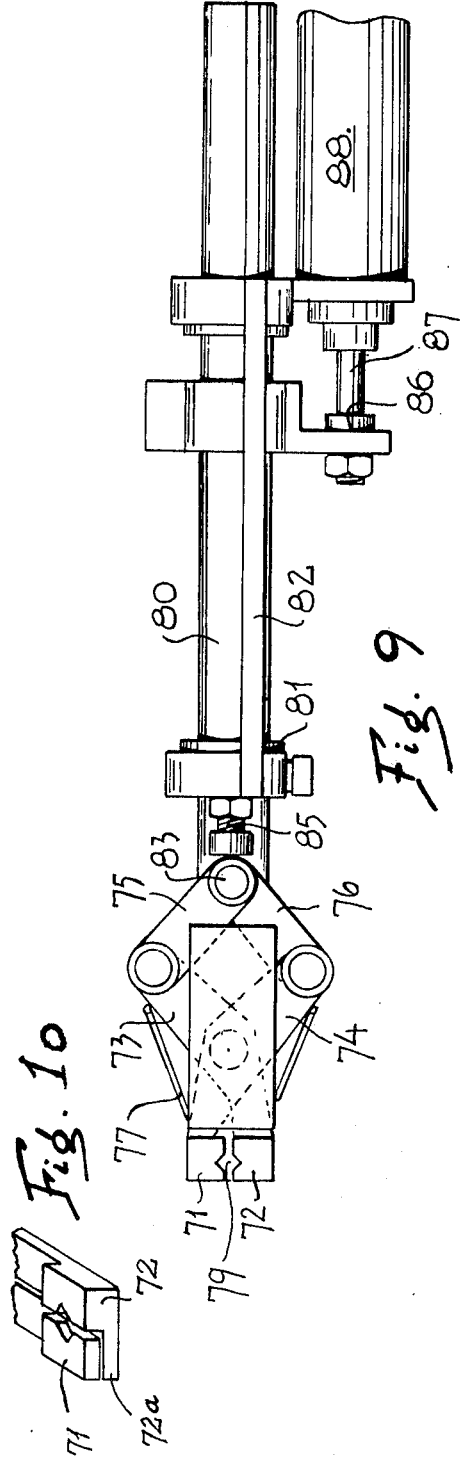

INSERT INSTALLING MACHINE

FIELD OF INVENTION

The invention is particularly useful in the case of installing inserts, namely small cylindrical steel parts having an inner screw thread and outer self-tapping, self-cutting windings which ensure a firm grip of the insert within the work. The inserts are driven into bores of a diameter somewhat smaller than the outside diameter of the inserts, by being pressed and rotated until they reach the desired depth. This is performed by first threading the insert on a stud or spindle forming the nib of a driving head, similar to that of a drilling machine, and continuously pressing the insert into the bore. Once the insert is fully driven into the bore, the rotation of the spindle is reversed to retract same from the insert.

BACKGROUND OF INVENTION

In most known machines for this purpose, the driving head is operated by an air turbine and it is adapted to be manually lowered, raised and tracted in all directions, to reach any point (within practical limits) of a stationary work piece. The inserts are also manually threaded on the spindle, one by one, and wetted, e.g. by means of a small brush, with a special adhesive fluid (known under the Trade Name "Locktite"), which is necessary for the safe setting of the insert.

This method is relatively slow and, besides, it causes considerable waste of the extremely expensive adhesive fluid.

There have been designed and used insert installing machines with automatic insert feeding and loading devices. However such machines, without exception, still have the characteristics of conventional drilling machines, namely that the installing head reciprocates along a fixed vertical axis. This means that each bore of the work has first to be brought into alignment with the axis of the spindle, a matter which is highly inconvenient in its own regard, and renders the machine impracticable in cases where large or heavy work pieces are to be processed.

OBJECTS OF THE INVENTION

It is the object of the present invention to devise a semiautomatic insert feeding and loading means for the hand tracted type of installing machines.

It is a further object of the invention that the picking-up of the inserts by the spindle shall not interfere with the normal reciprocation and traction procedure of the machine.

It is a still further object of the invention to provide automatic "Locktite" dosing or portioning device for wetting the inserts prior to each installing cycle, by the optimal quantity, with no surplus or waste of the fluid.

SHORT SUMMARY OF THE INVENTION

According to the invention there is provided an insert installing machine of the type having a framework for supporting a vertically reciprocable, horizontally tractable installer head with a rotatable spindle onto which inserts are threaded one at a time for the installation thereof in suitable bores provided in the work and control means for reversing the rotation of the spindle on every installing cycle, said machine comprising insert holding means transferable between a first position, wherein the insert is held in axial alignment with respect to said spindle, and a second position, means for transferring the said holding means from the first position to the second position during the threading of an insert on said spindle and means for feeding inserts to said holding means when in the second position.

Said insert holding means may comprise in a first executional form a spring-biased, insert arresting member normally engaging the insert positioned within a recessed insert supporting block, said block being mounted on an arm member fixedly connected to a rotatable rod, driving means being provided for rotating the said rod between angular positions corresponding to said first and second positions. The driving means may comprise an air cylinder mounted on said framework, the piston rod thereof being operatively connected to said rotatable rod.

In an alternative, second executional form the machine may comprise — in lieu of the mechanism according to the foregoing paragraph — an insert pick-up assembly which comprises a pair of jaws attached in a scissor-like manner to two linked members of a form bar chain, the opposite two linked bars of that form bar chain being operable by a push member.

The machine may further comprise control means for transferring said insert holding means from the first position to the second position at any predetermined position of the head during downwards travel thereof, and further control means for transferring said insert holding means from the second position to the first position at any predetermined position of the head during the upwards travel thereof.

The insert feeding means are preferably comprised of a magazine wherein inserts are piled up in axial alignment with respect to each other, means being provided for continuously supplying inserts to said magazine, and said arm member of the first executional form being provided with an extension member slidable underneath said magazine for supporting the inserts between successive second position operation stages. In the second executional form the jaws form a seat for the insert being held.

An injector device may be provided for wetting inserts, one at a time, with adhesive fluid, said device comprising a reservoir for containing said fluid under air pressure, and a diaphragm operated, air controlled dispenser valve intermittently allowing a predetermined quantity of said fluid to be ejected from an outlet of said valve leading to an injection nozzle.

There has thus been outlined rather broadly the more important constructional features of the present invention in order that the detailed description thereof that follows may be better understood, and in order that the present contribution to the art may be better appreciated. There are additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and the scope of the invention.

SHORT DESCRIPTION OF THE DRAWINGS

FIGS. 8, 9 and 10 related to said second executional embodiment,

FIG. 8 being a lateral elevational view,

FIG. 9 a plan view, and

FIG. 10 a perspective view of a detail.

DESCRIPTION OF PREFERRED EMBODIMENTS

Figure 1:
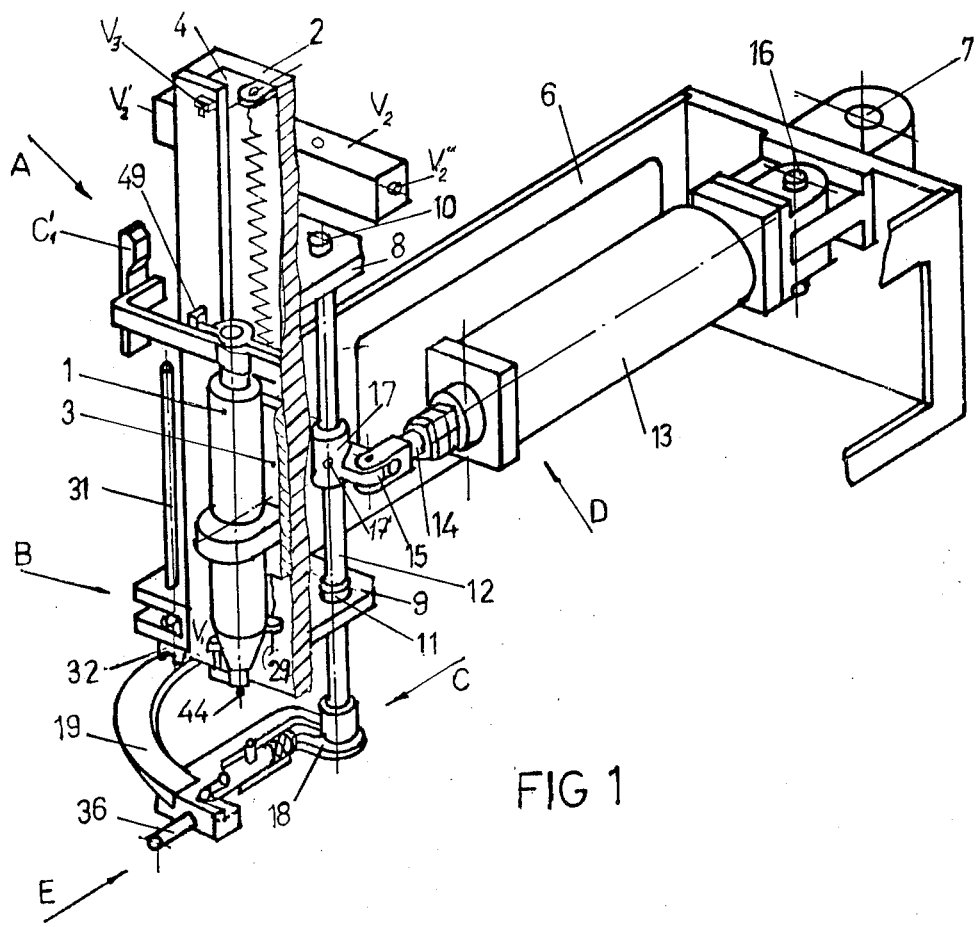
FIG. 1 is a general perspective view of the semiautomatic insert installation machine provided with the feeding, pick-up and the "Locktite" injector assemblies according to the present invention.

The machine may generally be divided into the following main assemblies, as denoted in FIG. 1 by the respective symbols:

A. The installer head assembly.
B. The insert feeding assembly.
C. The retractable insert pick-up assembly.
D. The retraction mechanism for the pick-up assembly.
E. The "Locktite" fluid injector assembly.

The air operated installer head is slidably mounted on a support plate 2 (part of which has been removed in the drawing for the sake of clarity). In operation of the machine, the head is manipulated up and down by the operator, while the back plate 3 thereof is guided within grooves 4 provided at each side of the support plate 2. The weight of the head is counter-balanced by the spring 5.

The installer head assembly A is adapted to move horizontally in all directions, while always keeping parallel to the vertical axis of the head. To this end, the support plate 2 is fixed to the framework 6, swivable about the vertical axis 7 forming one end of a second framework or arm (not shown), also journaled to a vertical axle. Alternatively, any other equivalent means may be used for faciliting the free translation of the frame 6 in a pre-set horizontal plane, in order to attain the access of the head 1 above all insert bores of the work.

Figure 2:
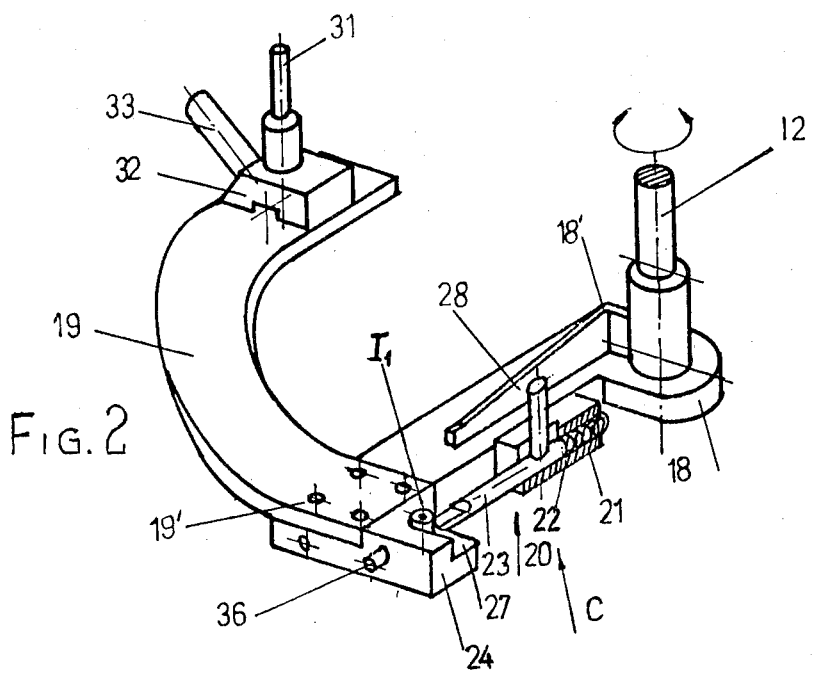
FIG. 2 is a perspective view, on an enlarged scale, of the feeding and pick-up assemblies shown in FIG. 1.
Figure 3:
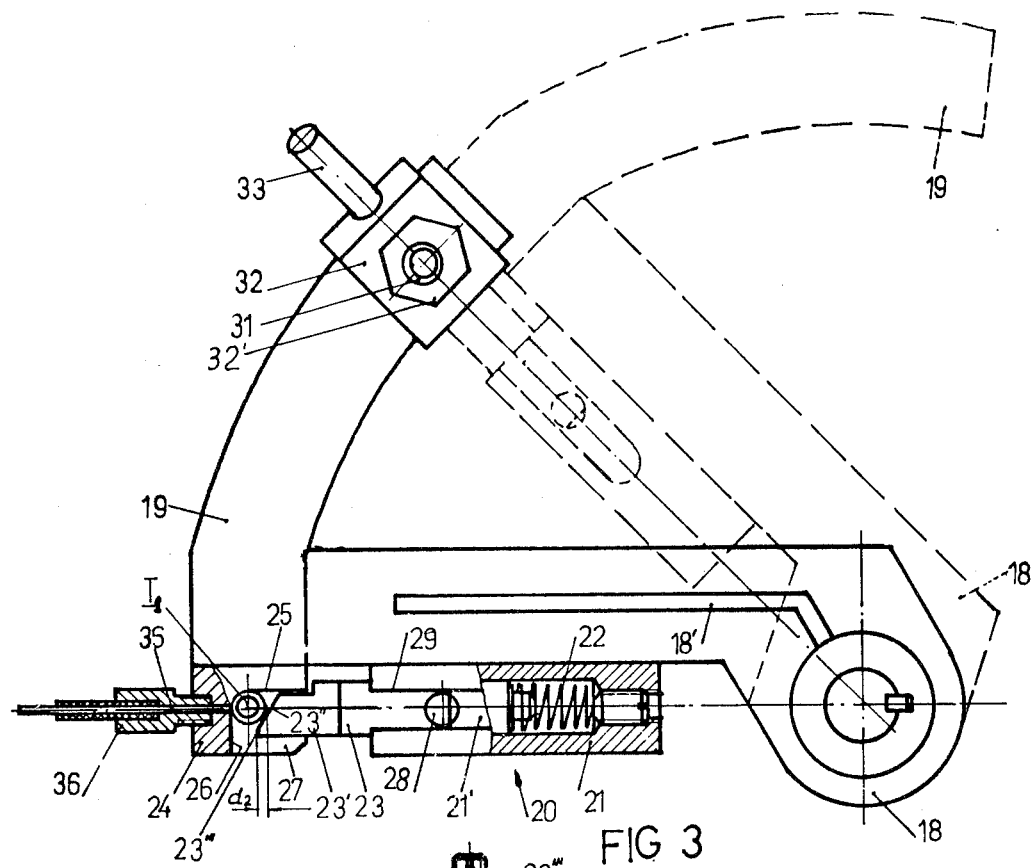
FIG. 3 is a plan view, partly in cross-section, of the pick-up assembly.

Fixed to the back side of the plate 2 are two plates 8, 9, supporting a pair of bearings 10, 11 for the vertical rod 12. Rotation of the rod 12 is effected by the air cylinder 13 having its piston rod 14 journaled to the lug 15. The cylinder end is journaled by the pivot 16 to the back side of the framework 6. The lug 15 is adjustably fastened to the vertical rod 12 through the bushing 17 and set-screw 17'. The lower, free end of the rod 12 carries an L-shaped arm member 18, reinforced by an upright rib 18' (see FIG. 2) having an arcuate extension 19 fixed thereto by bolts 19'. The arm 18 has attached thereto the insert retaining assembly generally indicated 20. It comprises the block 21 having a guiding bore 22 in which the insert arresting pin 23 is slideable. The pin 23 is spring biased in the direction of the prism block 24 formed by the surfaces 25, 26 of the recess 27 (FIG. 3).

The pin 23 is preferably formed with flattened end 23' terminating with a tapered surface 23" and a tip 23'''. This insures a reliable grip of the insert $I_1$ at the corner of the prism 24.

The pin 23 is further provided with an upright member 28 screwed or otherwise forced-fitted to the pin 23 and projecting through a slot 29 provided at the top of the block 21. The axial length of the slot 21' is so designed that the pin 23 may be retracted, through operating the upright pin 28 backwards, by a distance $d_1$ which is at least equal to the distance $d_2$, so as to clear the way out of the insert $I_1$ when the arm 18 is turned by the rod 12.

Figure 4:
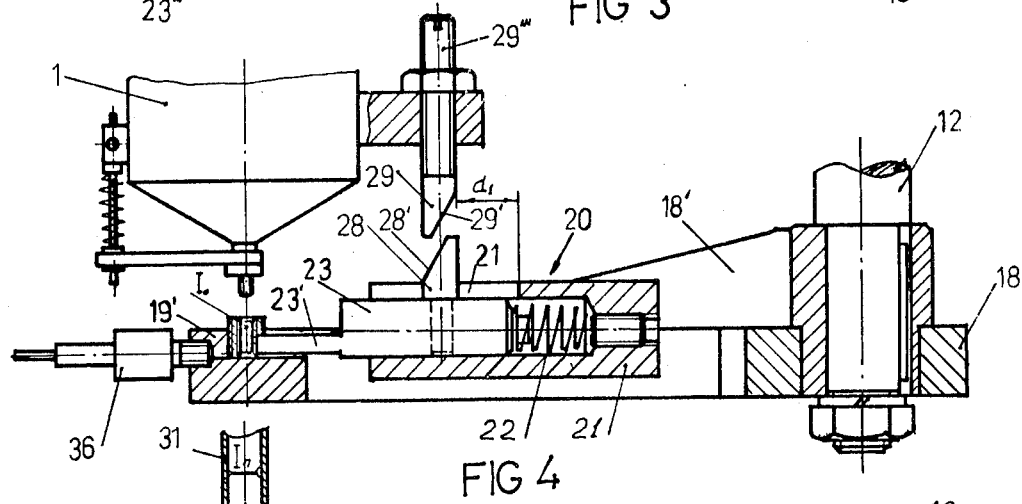
FIG. 4 is a cross-section along line 1 — 1 of FIG. 3.

The pin 28 terminates with a tapered, cam-like surface 28' designed to be engaged by complementary surfaces 29' and 30' of abutment pins 29 (FIG. 4) and 30 (FIG. 5) when the arm 18 is in either the pick-up or the feeding positions, respectively, as will be explained in more detail below.

Figure 5:
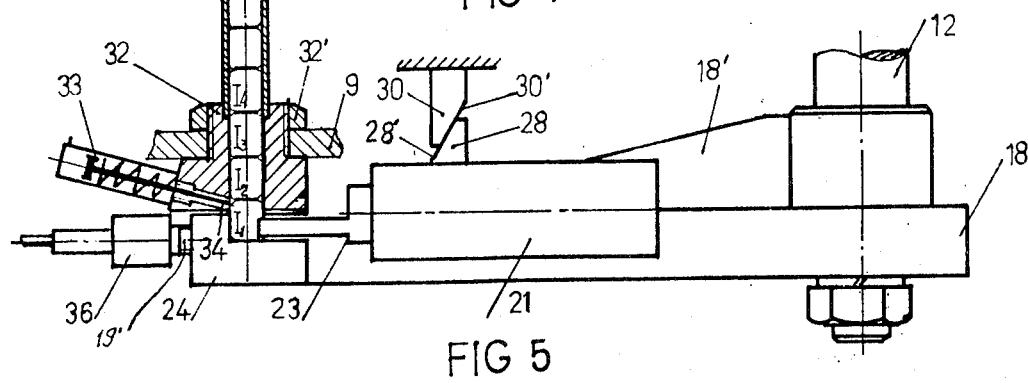
FIG. 5 is a cross-section along line II — II of FIG. 3, namely where the pick-up assembly is shown in the feeding position.

The feeding assembly B is best seen in FIG. 5. Inserts $I_1, I_2, I_3, \ldots, I_n$ are continuously fed by a vibrator or hopper device (not shown), to be piled one upon the other within the magazine tube 31. Alternatively, series of such tubes already filled with inserts, e.g. by mechanical means or manually, may be introduced, one at a time, to replace exhausted tubes. The tube 31 is attached to a block 32 fixedly connected to the plate 9 by the nut 32' (FIG. 5). Extension 19 of arm 18 is slidable underneath the block 32 when the former is operated by the rod 12. The stroke of the member 18 is so designed that at the extreme position thereof (as shown in dashed lines in FIG. 3), the insert seat formed within the prism 24 is aligned with the axis of magazine tube 31, i.e. in a position to properly receive inserts released therefrom.

A miniature air cylinder 33 is installed to the block 32. The spring biased piston rod 34 of the cylinder 33 penetrates through the wall of the block 32 and is adapted, upon the actuation of the cylinder, to clamp the next immediate insert $I_2$ against the opposite wall of the block while insert $I_1$ travels to the feeding position. The cylinder is deactivated only after the prism 24 is again brought to the feeding position. Insert $I_2$ then descends together with the whole column of inserts $I_3, I_4, \ldots$ piled thereabove. This arrangement assures that the inserts will not tilt when falling into position within the prism 24.

Figure 7:
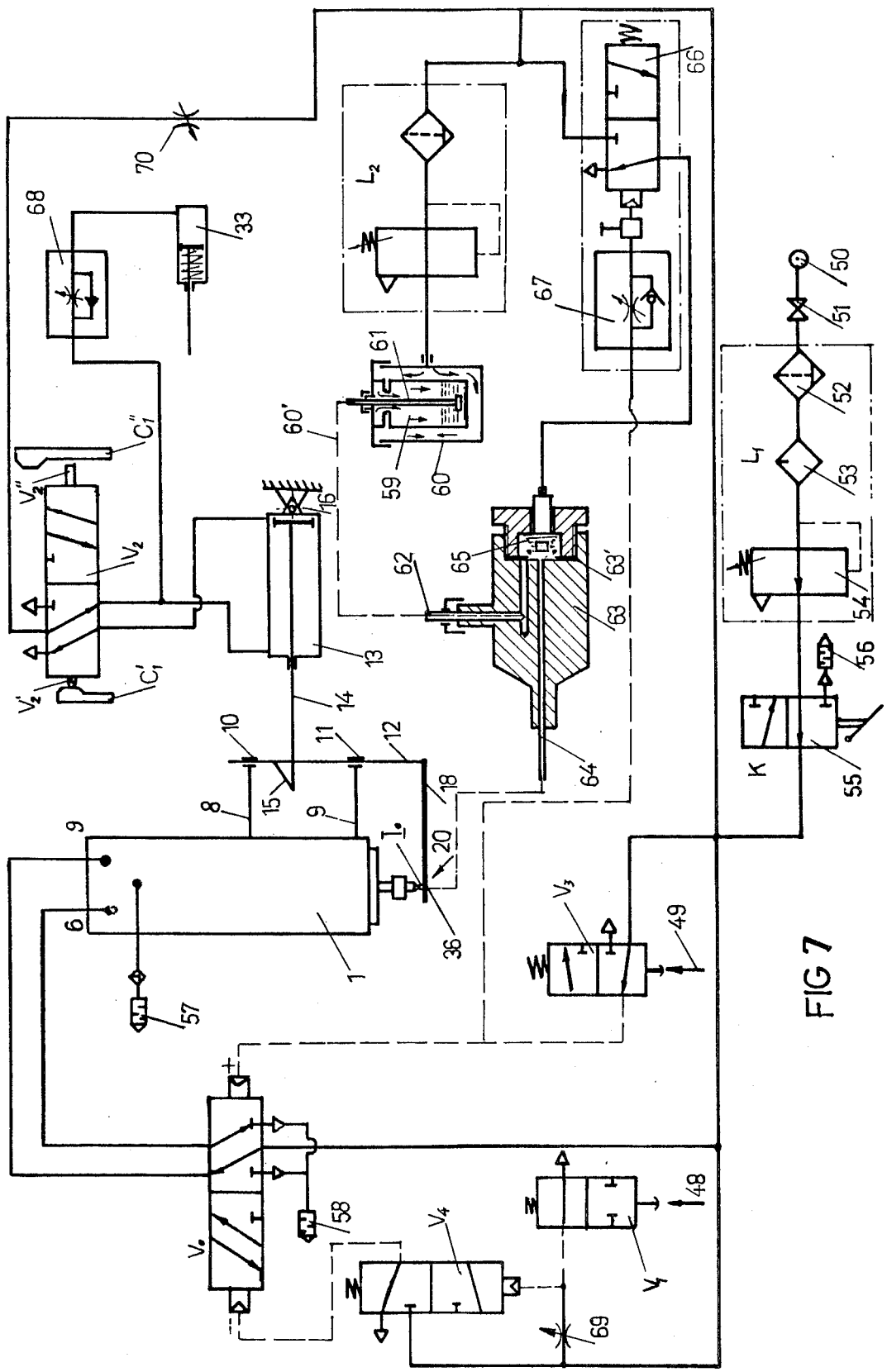
FIG. 7 is the pneumatic circuit of the machine.

The adhesive (Locktite) fluid injection assembly E comprises the nozzle 35 connected to an intermediate fitting 36 into which the fluid is continuously supplied under pressure from the reservoir 59 (FIG. 7). Further details of construction of a preferred embodiment of such device shall be given below in connection with the pneumatic diagram of the machine.

Figure 6:
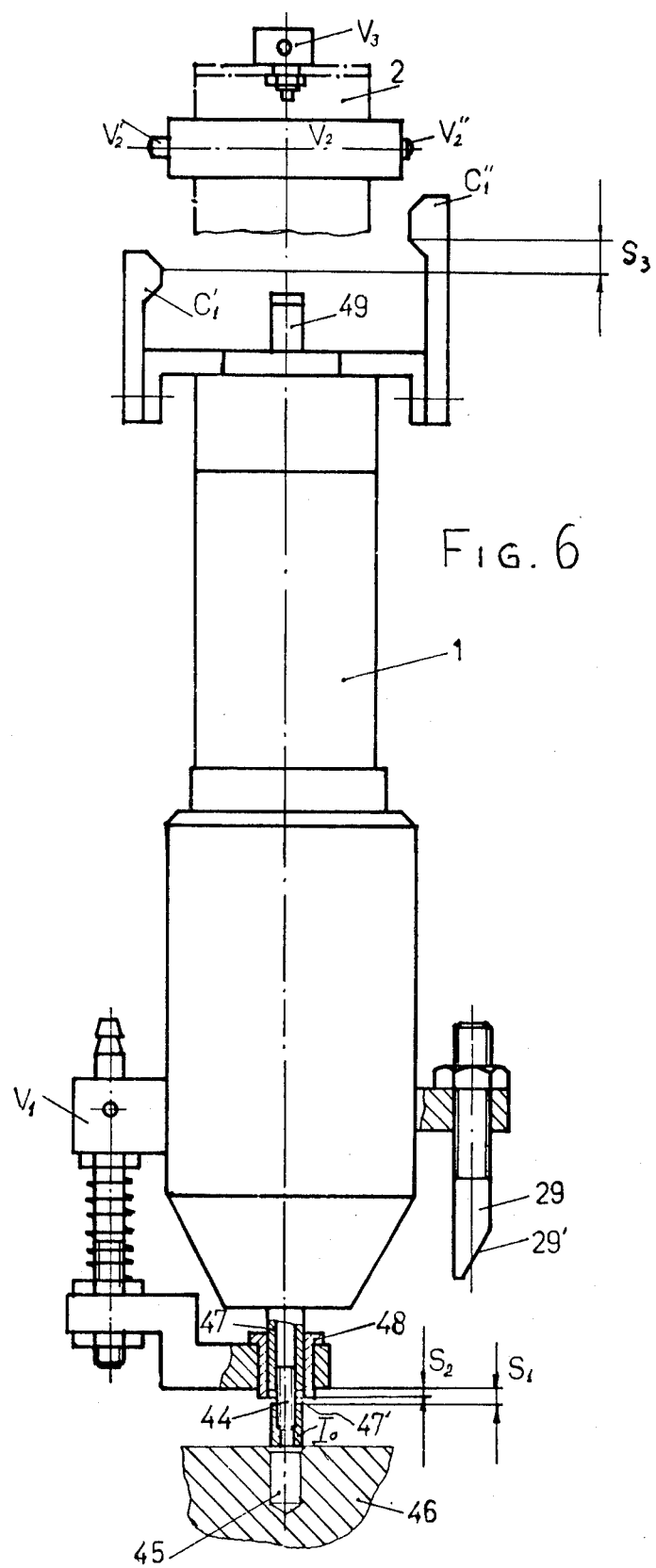
FIG. 6 shows schematically the installer head with the associated valve controls and switches.

Referring now to FIG. 6, there is shown the head 1 with its spindle 44 partly penetrating the insert $I_o$ which is about to be installed in the bore 45 of the work 46. It will be explained later why at this, initial position, the insert is not completely threaded on the spindle, i.e. a small gap $S_1$ is left, as shown.

When the insert touches the phased rim of the bore, the spindle rotates in the clockwise (+) direction, friction between the insert and the material of the work causes the spindle to fully enter into the insert until the upper surface of the insert abuts against the surface 47' of the spindle guide and bearing portion 47.

Now the insert starts to tap its way down the bore 45. Within a very small distance $S_2$, at the order of a few tenths of the milimeter, before the upper face of the insert becomes flush with the surface of the work 46, feeler bushing 48 engages the work and operate the air switch $V_1$ which reverses the rotation of the spindle. The gap $S_2$ is so designed that the small delay in reversing the rotation (due to the inertia of the revolving parts) is sufficient to allow the complete installing of the insert without being forcibly jammed within the bore before the spindle starts to be released from the insert by turning in the counter-clockwise (−) direction.

After the spindle is fully retracted from the insert, the head is raised by the operator. As more clearly shown in FIG. 1, there is provided, at the uppermost part of the head assembly, a two-directional air valve $V_2$, actuable by either of the push buttons $V_2'$, $V_2''$, the arrangement being such that only one of said buttons, at any given position of the valve, can be operated.

A pair of cam members $C_1'$ and $C_1''$ is rigidly connected to the head 1, the operating surfaces thereof being so located relative to each other and to the valve $V_2$ that $C_1''$ lags behind $C_1'$ when the head descends from an uppermost position, and $C_1'$ lags behind $C_1''$ when the head rises from the lowermost position. The phase between two successive actuations of $V_2'$ and $V_2''$ may be adjusted by changing the vertical distance. $S_3$.

Referring back to the operation procedure described, it is now self-evident that on the way upwards $C_1''$ will make no contact with button $V_2''$, but after it covers the additional distance $S_3$. $C_1'$ will operate $V_2'$.

Valve $V_2$ controls the operation of air cylinder 13 (FIG. 1), to transfer the pick-up assembly C to the feeding position, shown in dashed lines in FIG. 3, when button $V_2''$ is actuated, and to return same to the pick-up position when $V_2'$ is actuated. Therefore, in the presently described operation example, the first air switching ($V_2'$ by $C_1'$), will be to bring the pick-up assembly to the pick-up position.

At the end of the upward travel of the head the abutment 49 will actuate another air switch $V_3$ which again reverses the rotation of the spindle, i.e. back to the clockwise direction, and, furthermore, operates the fluid injector device 36, in a manner to be described below in connection with FIG. 7.

Now the head is pulled downwardly, starting the next installing cycle of insert $I_1$. Cam $C_1'$ passes by button $V_2'$ with no effect, since now only $V_2''$ is available, to be operated by Cam $C_1''$.

However, the height of $C_1''$ above the spindle is so adjusted that it does not reach the position of actuating button $V_2''$ until after the following series of operations is completed:

First, spindle 44 engages the threaded bore of the insert $I_1$ held within the prism 24 by the spring loaded insert arresting pin 23. The force exerted by the tapered tip 23" ensures that, due to the friction between the insert and the surfaces of the prism, the insert will not revolve with the spindle. Consequently, the spindle starts to be threaded into the insert.

At a certain, predetermined point, e.g. when the spindle reaches about three-fourths of the depth of the insert, cam member 29, located behind the head 1 and fixed thereto (shown in FIG. 6 as if rotated by 90°) engages the tapered surface 28' of the upright pin 28 (see FIG. 1), pushing the pin 23 to the right. The friction grip on the insert is immediately released and it may rotate together with the spindle. Further descending of the head 1 results in the continued withdrawal of the pin 23 until it covers the distance $d_2$ (FIG. 3) which means that the distance between the tip 23''' and the surface 26 is greater than the outside diameter of the insert.

It is at this stage that cam $C_1''$ actuates button $V_2''$ and cylinder 13 acts to translate the pick-up assembly C back to the second, feeding position.

Upon reaching this position, the following series of operations take place. Surface 30' of the fixed finger 30 engages surface 28' to push the upright retraction pin 28 to the right, thus clearing the prism 24 for receiving the next insert $I_2$ from the tube or magazine 31. This insert is kept in a stand-by position, being slidably supported by the surface of member 19, as well as clamped by the piston-rod 34 of the air cylinder 33. Once the prism 24 is properly aligned underneath the insert $I_2$ cylinder 33 will be deactivated and the insert $I_2$ will fall by gravity into the prism and all piled-up inserts $I_3, I_4 \ldots I_n$ will follow suit.

In the meantime, namely during the above described feeding stage, the head has uninterruptedly continue to descent. When the bottom portion of the insert engages the bore 45 (FIG. 6), prior to the curring of the material by the insert threads, the insert gets temporarily jammed. This causes the complete penetration of the spindly into the insert, i.e. the closing of the gap $S_1$, and the entailed tapping of the insert till the closing of gap $S_2$ and the reversal of the spindle direction by valve $V_1$, as above explained.

Raising the head 1 once again will first cause the actuation of button $V_2'$ by cam $C_1'$, namely to bring the pick-up assembly from the feeding position to the pick-up position, carrying with it the insert $I_2$. Since pin 28 has been released from finger 30, insert $I_2$ is now firmly held by arresting pin 23. Immediately thereafter, cylinder 33 is operated, its piston rod 34 clamping the insert $I_3$ (at the upper part thereof) against the wall of the bore formed in block 32.

Actuation of valve $V_3$ at the end of the upwards stroke of the head 1 will change the direction of the spindle and operate the Locktite injection system, as already described. This completes the installing cycle, and the above described procedure of picking-up the insert, etc., is repeated.

FIG. 7 is the pneumatic circuit of the system according to the foregoing description, and includes, where appropriate for the sake of clarity, schematic representations of the associated mechanical components, designated by the same numerals as in the preceeding drawings.

Compressed air is supplied from the source 50, via main shutoff valve 51 into a standard air service unit $L_1$ which comprises the filter 52, the air lubricator 53 and the pressure regulator 54. Handoperated valve 55 (provided with silencer 56) controls the main air supply to the system.

Valve $V_o$, controlled by valves $V_3, V_4$, governs the rotation of the air turbine within the installing head 1. The valve $V_o$ is shown in the position of driving the spindle in the clockwise direction (+), namely, the right-hand side of the valve is operative, having been actuated by an air impulse generated by valve $V_3$ after the head 1 has reached its uppermost position and starts the downwards stroke. Excess air is exhausted through silencers 57,58.

At the same time, while the pick-up assembly is in the first position, operation of the Locktite injecting system is effected, as follows.

The system comprises the reservoir 59 containing the fluid, which is continuously kept under air pressure reaching the outer casing 60 through a second air service unit $L_2$. The pressure tends to force the liquid, through the immersed tube 61, and conduit 61' into the inlet 62 of the diaphragm-controlled dispensing device 63. The diaphragm 63' normally seals the outlet port 64 under the combined action of the spring 65 and the line pressure reaching from the valve 66 (when in the right hand position).

Valve 66 is adapted to be actuated, i.e. to cut-off pressure to the right hand side of the diaphragm 63' thus allowing fluid to be dispensed by injector 36 (FIG. 3), by a pressure pulse from the (+) side of the valve $V_o$, when valve $V_3$ is actuated by abutment 49. Upon actuation, however, the pneumatic time delay device 67 is also operated, causing valve 66 to reassume its normal, cut-off position only after a certain interval, after which the outlet port 64 of the dispensing device 63 is shut-off. The delay time of device 67 may be adjusted, to apply the correct Locktite quantity for any required use of the installing machine of this invention.

The following step of operation is, as it was above explained, the actuation of button $V_2''$ by the cam $C_1''$, resulting in the supply of pressure to cylinder 13 to push the piston outwardly. Rod 12, supported by plates 8,9 rotates to transfer the pick-up assembly 20 to the second, feeding position immediately after an inset is partly threaded on the spindle.

Via the pneumatic delay device 68, the pressure, previously built-up within the spring loaded insert retaining piston 33, is released, the timing being so preset that the stand-by insert — being no longer clamped by the spring loaded piston-rod — is allowed to drop into the pick-up assembly just after the latter is correctly positioned, as above described.

Towards the completion of an installing operation, bushing 48 actuates valve $V_1$. After a certain, preset delay period effected through delay device 69, valve $V_4$ is controlled to reverse the rotation of the spindle, by connecting the left-hand side (−) of valve $V_o$ the line pressure. Valves $V_1$ and $V_4$ reassume their initial operative position by their respective springs after the release of bushing 48, i.e. the beginning of the rise of head 1 while the spindle is unscrewed from the installed insert.

Cam $C_1'$ operates valve $V_2$ while the head 1 approaches its uppermost position, directing the line pressure to the cylinder 33. At the same time, the piston of cylinder 13 moves to the right returning the loaded pick-up assembly to the first position.

Reaching the end of the upward stroke brings about the activation of valve $V_3$ and the entailed direction reversal of the spindle and the injection of the adhesive fluid, as above described, thereby completing a full operational cycle.

If necessary for cushioning the strokes of cylinders 13 and 33, an air speed reducer 70 may be incorporated in the system, as shown.

Turning now to FIGS. 8 and 9, two jaws 71 and 72 are affixed to two bars 73, 74 of a four bar chain 73, 74, 75, 76. To attain the scissor effect — as will be seen later — jaw 72 is affixed to, or is integral with, bar 73 and jaw 71 with bar 74. Spring 77 tends to keep the two jaws in close relatoship of one another. The two jaws have oppositely disposed nicks of V-shape indicated by the numeral 79 which form a gripping emplacement for an insert to be received.

The assembly of jaws and four bar chain is carried at the end of a rod 80 held slidingly in an eye 81 dependent from a plate member 82 being part of the machine frame. The pivot 83 joining bars 75 is constituted by a short bolt 83 which extends downwardly into a slot 84 milled into rod 80. From the forward end of member 82 extends towards the pivoted juncture of bars 75, 76 — a headed bolt 85 which can be screwed into and out of member 82. The bolt 83 fits tightly in slot 84. The build and shape of the jaws 71, 72 will become clear from FIG. 10. One of the jaws — 72 in FIG. 10 — has the above mentioned nick 79 and its lowermost portion caries a laterally extending plate 72a. The opposite jaw 71 is positioned above the plate 72a and also has a nick 79, as described above, the two nicks being positioned symmetrically, their open sides facing one another. The rod 80 is connected at 86 with the piston rod 87, of an air-cylinder 88 constituting the drive means of the machine.

The pneumatic drive described above will serve in an identical manner whenever the machine is equipped with the assembly according to FIGS. 8 - 10.

The mechanism of FIGS. 8 - 10 functions as follows:

Presuming that the position of the pick-up assembly shown in FIG. 8 is its extreme "rearward" position, the two bars joined pivotally by bolt 83 abut against the head of bolt 85 thereby spreading apart the two bars 75, 76, i.e. rendering the angle defined by them more obtuse, causing bars 73, 74 to follow suit and opening the jaws 71, 72. At that instant an insert drops from magazine M (in the manner described above) onto the plate 71 forming a seat for the received insert. The attendant now causes the piston in cylinder 88 to move outwardly shifting the rod axially forwardly. Consequently to this, the four bar chain 73–74–75–76 ceases to be under urge exerted on it by the abutment 85. As a result the springs 77 causes the jaws to close and to firmly rip the insert resting between them in the emplacement formed by nicks 79. The rod 80 with its appendage, namely the four bar chain and the jaws continues to move forwardly until the insert is below the driver head DH. In the manner described in our co-pending application, the spindle of the head DH descends, rotatingly engages the insert in the manner described and places it in its destined place.

Also, in the manner described the rotatory movement of the spindle is reversed which disengages from the placed insert and by its outward movement, over a cam mechanism actuates the pneumatic drive causing the rearward movement of the rod 80 and the appended mechanism until the four bar chain abuts against bolt 85, the jaws open and the performance repeats.

During the opening and closing of the jaws 71, 72, strict symmetry of these parts is retained due to the fact that pivot 83 is held to the line of symmetry which coincides with the longitudinal axis of slot 84.

Having thus described the invention with particular reference to the preferred form thereof, it will be obvious to those skilled in the art to which the invention pertains, that various changes and modifications may be made therein without departing from the spirit and scope of the invention, as defined by the appended claims.

We claim:

1. Inserts installing machine of the type having a framework for supporting a vertically reciprocable, horizontally tractable installer head with a rotatable spindle onto which inserts are threaded one at a time for the installation thereof in suitable bores provided in the work and control means for reversing the rotation of the spindle on every installing cycle, said machine comprising insert holding means transferable between a first position, wherein the insert is held in axial alignment with respect to said spindle and a second position; means for transferring the said holding means from the first position to the second position after the threading of an insert on said spindle and means for feeding inserts to said holding means when in the second position, wherein said insert holding means comprises a spring-biased, insert arresting member normally engaging an insert positioned within a recessed insert supporting block, said block being mounted on an arm member journalled to said framework.

2. The machine of claim 1 wherein said arm member is fixedly connected to a rotatable rod, driving means being provided for rotating the said rod between angular positions corresponding to said first and second positions.

3. The machine of claim 2 wherein said driving means comprises an air cylinder mounted on said framework the piston rod thereof being operatively connected to said rotatable rod.

4. The machine of claim 3 comprising a first cam member mounted on said head and adapted to engage for releasing said arresting member at any predetermined position of the head while the said holding means are in the first position, and a second cam member mounted on said framework and adapted to engage for releasing said arresting member while the said holding means are in the second position.

5. The machine of claim 1 comprising control means for transferring said insert holding means from the first position to the second position at any predetermined position of the head during downwards travel thereof.

6. The machine of claim 5 comprising control means for transferring said insert holding means from the second position to the first position at any predetermined position of the head during the upwards travel thereof.

7. The machine of claim 6, said control means comprising third and fourth cam members mounted on said head and adapted to successively operate said driving means, the engaging surfaces of said cam members being vertically distanced with respect to each other.

8. The machine of claim 7 wherein said third cam member is adapted to operate said driving means during the threading of an insert onto said spindle.

9. The machine of claim 8 wherein said first cam member is adapted to engage the said arresting member for releasing an insert at a predetermined position of the head prior to the operation of the said driving means by said third cam member.

10. The machine of claim 7 comprising a change-over air valve for actuating said driving means, said valve having a housing, a doubleacting piston with piston-rods projecting, one at a time, from either side of said housing, to be sequentially engaged by either of said third and fourth cam members, respectively.

11. The machine of claim 1, said insert feeding means comprising a magazine wherein inserts are piled up in axial alignment with respect to each other, means being provided for continuously supplying inserts to said magazine.

12. The machine of claim 11, said arm member being provided with an extension member slidable underneath said magazine for supporting the inserts between successive second position operational stages.

13. The machine of claim 12, comprising an air cylinder operable to clamp the insert when in slidable contact with said extention member between successive second position operational stages.

14. Inserts installing machine of the type having a framework for supporting a vertically reciprocable, horizontally tractable installer head with a rotatable spindle onto which inserts are threaded one at a time for the installation thereof in suitable bores provided in the work and control means for reversing the rotation of the spindle on every installing cycle, said machine comprising insert holding means transferable between a first position, wherein the insert is held in axial alignment with respect to said spindle and a second position; means for transferring the said holding means from the first position to the second position after the threading of an insert on said spindle; means for feeding inserts to said holding means when in the second position; and an injector device for wetting inserts, one at a time, with adhesive fluid.

15. The machine of claim 14 wherein said insert feeding means comprises a magazine wherein inserts are piled up in axial alignment with respect to each other, means being provided for continuously supplying inserts to said magazine.

16. The machine of claim 15 said injector device comprising an injection nozzle attachable to said recessed insert supporting block.

17. The machine of claim 16 said injector device comprising a reservoir for containing said fluid under air pressure, and a diaphragm operated, air controlled dispenser valve intermittently allowing a predetermined quantity of said fluid to be ejected from an outlet of said valve leading to said injection nozzle.

18. The machine of claim 2, said spindle being operated by an air turbine.

19. Inserts installing machine of the type having a framework for supporting a vertically reciprocable, horizontally tractable installer head with a rotatable spindle onto which inserts are threaded one at a time for the installation thereof in suitable bores provided in the work and control means for reversing the rotation of the spindle on every installing cycle, said machine comprising insert holding means transferable between a first position, wherein the insert is held in axial alignment with respect to said spindle and a second position; means for transferring the said holding means from the first position to the second position after the threading of an insert on said spindle; means for feeding inserts to said holding means when in the second position; and an insert pick up assembly comprising a pair of jaws attached in a scissor-like manner to two linked members of a four bar chain, the opposite two lined bars of the four bar chain being operable by a push member.

20. The pick-up assembly claimed in claim 19 characterised by the provision of means ensuring symmetry of the four bar chain and the jaws at all positions thereof.

21. The pick-up assembly claimed in claim 19 characterised thereby that the said push member is adjustable in relation to the four bar chain.

22. The pick-up assembly claimed in claim 19 characterised thereby that one of the said jaws is formed with a plate like extension which juts out laterally from the jaw and extends underneath the opposite jaw, so as to form a seat for an insert dropped thereon to be gripped by the pair of jaws.

23. The pick up assembly claimed in claim 20, wherein the pivot at the four bar chain diametrically opposite the position of the jaw is guided in a guide slot provided in the member carrying the assembly of four bar chain and jaws.

24. The machine of claim 19 wherein said insert feeding means comprises a magazine wherein inserts are piled up in axial allignment with respect to each other, means being provided for continuously supplying inserts to said magazine.

* * * * *